US008848769B2

(12) United States Patent
Mobin et al.

(10) Patent No.: US 8,848,769 B2
(45) Date of Patent: Sep. 30, 2014

(54) JOINT TRANSMITTER AND RECEIVER GAIN OPTIMIZATION FOR HIGH-SPEED SERIAL DATA SYSTEMS

(71) Applicant: LSI Corporation, Milpitas, CA (US)

(72) Inventors: Mohammad Mobin, Orefield, PA (US); Vladimir Sindalovsky, Perkasie, PA (US); Amaresh Malipatil, San Jose, CA (US); Thomas F. Gibbons, Jr., Macungie, PA (US); Ye Liu, San Jose, CA (US); Lane A. Smith, Easton, PA (US)

(73) Assignee: LSI Corporation, Milpitas, CA (US)

( * ) Notice: Subject to any disclaimer, the term of this patent is extended or adjusted under 35 U.S.C. 154(b) by 55 days.

(21) Appl. No.: 13/647,502

(22) Filed: Oct. 9, 2012

(65) Prior Publication Data

US 2014/0098844 A1 Apr. 10, 2014

(51) Int. Cl.
*H04B 1/38* (2006.01)
*H04L 5/16* (2006.01)
*H04B 1/40* (2006.01)

(52) U.S. Cl.
CPC .................................. *H04B 1/40* (2013.01)
USPC ........................................................ 375/219

(58) Field of Classification Search
USPC ........................................................... 375/219
See application file for complete search history.

(56) References Cited

U.S. PATENT DOCUMENTS

| | | | |
|---|---|---|---|
| 5,978,473 A | 11/1999 | Rasmusson | |
| 7,016,406 B1 | 3/2006 | Phanse et al. | |
| 7,430,161 B2 * | 9/2008 | Hidaka | 370/200 |
| 7,440,497 B2 | 10/2008 | Balan et al. | |
| 7,599,461 B2 | 10/2009 | Aziz et al. | |
| 7,616,686 B2 | 11/2009 | Aziz et al. | |
| 7,636,408 B2 | 12/2009 | Bau et al. | |
| 2006/0291457 A1 * | 12/2006 | Hidaka | 370/369 |
| 2010/0272004 A1 * | 10/2010 | Maeda et al. | 370/312 |
| 2014/0023131 A1 * | 1/2014 | Sindalovsky et al. | 375/232 |

OTHER PUBLICATIONS

Ying Tan, Dragan Nesic, Iven Mareels; On the choice of dither in extremum seeking systems: A case study; www.sciencedirect.com; http://www.elsevier.com/locate/automatica; Mar. 4, 2008; Automatica 44 (2008) 1446-1450; The Department of Electrical & Electronics Engineering, The University of Melbourne, Melbourne, VIC 3010, Australia.

D.A. Johns, W.M. Snelgrove, A.S. Sedra; Continuous-Time LMS Adaptive Recursive Filters; Trans. on CAS; Feb. 11, 1991.

Anthony Tong, Paul J. Hurst; A Mixed-Signal Approach for Tuning Continuous-Time Low-Pass Filters; Solid State Circuits Research Laboratory; Department of Electrical and Computer Engineering; University of California; Nov. 19, 2003.

* cited by examiner

*Primary Examiner* — Erin File

(57) ABSTRACT

Embodiments of the present invention allow for adjustment of transmitter amplitude during joint transmitter (TX) and receiver (RX) equalization. During joint TX and RX adaptation, when the receiver requires a gain update, the receiver gain update is masked above or below a preset range. The RX gain update (instruction) is encoded into a transmitter amplitude update (instruction) transferred through back channel communication. The translation of RX gain to TX amplitude update is performed after the RX gain reaches a specified range. Such masking, encoding and translation reserves a certain amount RX gain range to account for RX gain variation due to process, voltage, and temperature (PVT) changes over time, and also to offer better linear equalization in the receiver over a constrained VGA bandwidth.

18 Claims, 9 Drawing Sheets

FIG. 4

| STEP | ADAPTATION LOOP GAIN α | WINDOW WIDTH | WINDOW HEIGHT | COMMENT |
|---|---|---|---|---|
| 1 | α1 | T1 | H1 | ACQUISITION SETTINGS |
| 2 | α2 (α2 < α1) | T2 (T2 < T1) | H2 (H2 < H1) | INTERMEDIATE |
| 3 | α3 (α3 < α2) | T3 (T3 < T2) | H3 (H3 < H2) | MINIMUM WINDOW, GAIN |

FIG. 9
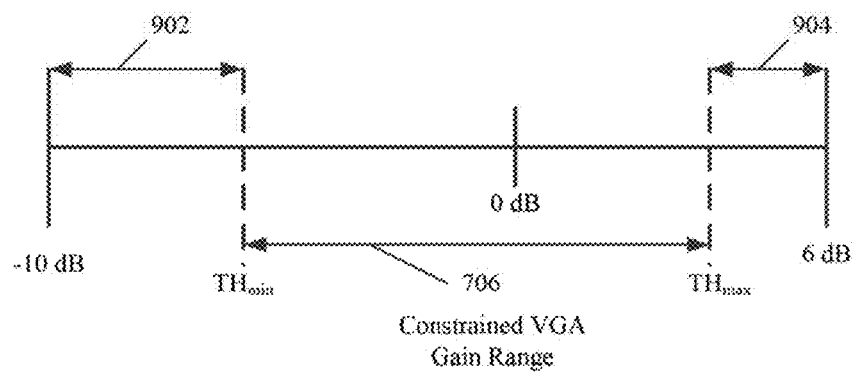
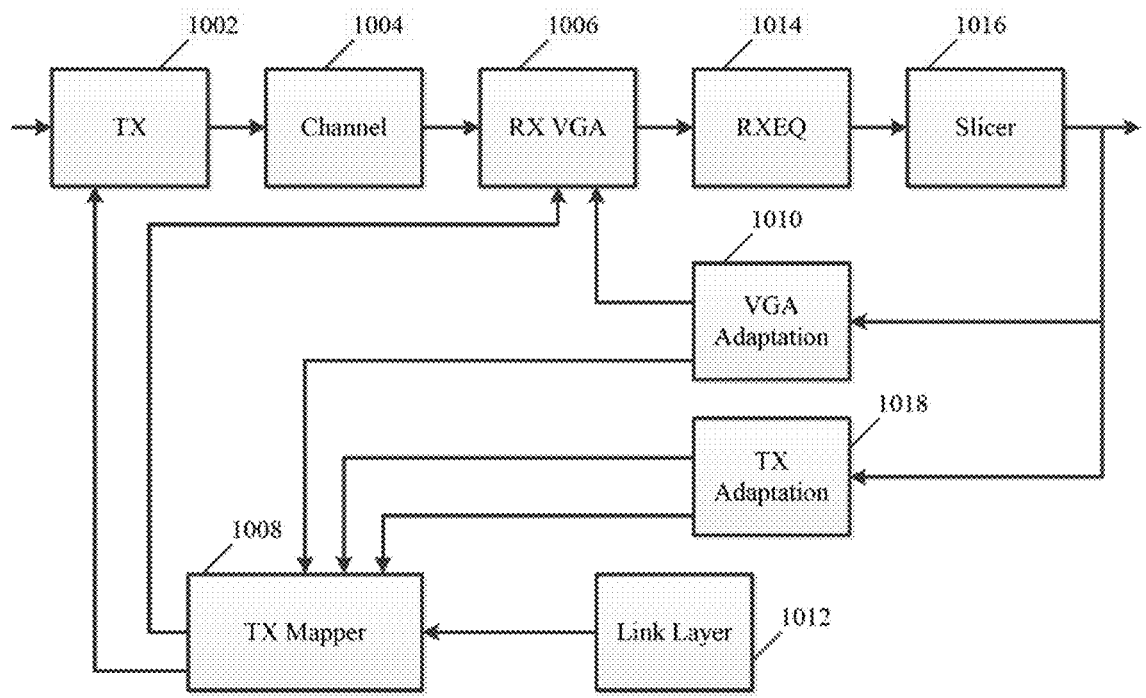
FIG. 10

| Coeffi-cient 1 request | Coeffi-cient 2 request | Coeffi-cient 3 request | Description | Vpk(k+1)-Vpk(k) (mV) | v1(k+1) - V1(k) (mV) | v2(k+1) - V2(k) (mV) | v3(k+1) - V3(k) (mV) |
|---|---|---|---|---|---|---|---|
| hold [a] | hold [a] | hold [a] | Hold amplitude and hold equalization | -10 to +10 | -10 to +10 | -10 to +10 | -10 to +10 |
| dec [b] | dec [b] | hold [a] | Increase pre-cursor and hold amplitude | -10 to +10 | -40 to -10 | -40 to -10 | -10 to +10 |
| inc [c] | inc [c] | hold [a] | Decrease pre-cursor and hold amplitude | -10 to +10 | +40 to +10 | +40 to +10 | -10 to +10 |
| hold [a] | dec [b] | dec [b] | Increase post-cursor and hold amplitude | -10 to +10 | -10 to +10 | -40 to -10 | -40 to -10 |
| hold [a] | inc [c] | inc [c] | Decrease post-cursor and hold amplitude | -10 to +10 | -10 to +10 | +40 to +10 | +40 to +10 |
| hold [a] | dec [b] | hold [a] | Decrease amplitude and hold equalization | -40 to -10 | -20 to -5 | -20 to -5 | -20 to -5 |
| hold [a] | inc [c] | hold [a] | Increase amplitude and hold equalization | +40 to +10 | +20 to +5 | +20 to +5 | +20 to +5 |
| dec [b] | hold [a] | hold [a] | Increase pre-cursor and increase amplitude | +40 to +10 | -20 to -5 | -20 to -5 | +20 to +5 |
| inc [c] | hold [a] | hold [a] | Decrease pre-cursor and decrease amplitude | -40 to -10 | +20 to +5 | +20 to +5 | -20 to -5 |
| hold [a] | hold [a] | dec [b] | Increase post-cursor and increase amplitude | +40 to +10 | +20 to +5 | -20 to -5 | -20 to -5 |
| hold [a] | hold [a] | inc [c] | Decrease post-cursor and decrease amplitude | -40 to -10 | -20 to -5 | +20 to +5 | +20 to +5 |

[a] hold: Requests no change be made to the coefficient. Equivalent to hold in SPL-2.
[b] dec: Request to make the coefficient more negative. Equivalent to decrement in SPL-2.
[c] inc: Request to make the coefficient more positive. Equivalent to increment in SPL-2.

FIG. 11

JOINT TRANSMITTER AND RECEIVER GAIN OPTIMIZATION FOR HIGH-SPEED SERIAL DATA SYSTEMS

CROSS-REFERENCE TO RELATED APPLICATIONS

The subject matter of this application is related to U.S. patent application Ser. No. 13/360,978 filed Jan. 30, 2012, the teachings of which are incorporated herein by reference.

BACKGROUND

Multi-gigabit per second (Gbps) communication between various chips or "ports" on a circuit board or modules on a backplane has been in use for quite a while. Data transmission is usually from a transmitter that serializes parallel data for transmission over a communication media, such as twisted pair conductors as a cable or embedded in a backplane, fiber optic cable, or coaxial cable(s), to a receiver that recovers the transmitted data and deserializes the data into parallel form. However, data transmission greater than 8 Gbps over communication paths has been difficult to achieve because various signal impairments, such as intersymbol interference (ISI), crosstalk, echo, and other noise, can corrupt the received data signal to such an extent that a receiver is unable to recover the transmitted data at the desired high data rate with an acceptable level of error performance.

Various techniques are employed to improve the performance of the receiver. One technique is to provide the receiver with a variable gain amplifier (VGA) to assure signal linearity within a desired dynamic range, and a multi-band adjustable analog (linear) equalizer to compensate for frequency-dependent losses. Together these amplifiers might be considered part of the analog front-end equalization (AFE). An adjustable decision feedback equalizer might also be included to compensate for interference cancellation and other non-linear distortions of the channel. Quality of the received signal might be characterized by a shape of the data eye (e.g., the amount of "eye opening") observed at the receiver.

Even though the quality of the received signal can be improved by the AFE, the complexity of the AFE needed to handle different serial communication protocols (e.g., PCIe Gen3, 12G SAS, SAS-3, 16GFC, and 10GBASE-KR, all of which standard specifications are included herein by reference in their entirety) over communication channels ranging from short, highly reflective channels to long-span channels with a poor insertion loss-to-crosstalk ratio (ICR) may be too complicated to implement cost effectively. Further, the amount of frequency-dependent distortion and interference may exceed the capability of the AFE such that it cannot fully correct for them, resulting in unacceptably poor performance.

One way to improve the quality of the received signal is for the signal transmitter, located in a port coupled to the port with the receiver, to drive the channel with signals that have been pre-distorted by a filter. One such filter used to pre-distort the transmitted signal is a finite-impulse response (FIR) filter with adjustable coefficients or taps, referred to herein as a TXFIR filter. For lower speed applications, the filter coefficients might be predetermined, i.e., selected from a set of preset coefficients, based on the design of the channel and the protocol being implemented. However, with the need for high-speed (e.g., 8 Gbps and above) applications, using a fixed set of coefficients has not worked well for all transmitter/channel/receiver implementations. Even similar implementations may require significantly different TXFIR coefficient values for proper operation due to chip-to-chip electrical parameter variations of the integrated circuits embodying the transmitter and the receiver and the electrical characteristics of the channel media as well.

The standards bodies that administer the various serial communication protocols mentioned above recognized the shortcomings of using fixed TXFIR coefficients and provided in the protocols a feedback mechanism utilizing a back-channel to allow for adjustment of the TXFIR coefficients during initialization of the transmitter and receiver. The protocols allow for the receiver to adapt the TXFIR coefficients by receiving a known data pattern from the transmitter and communicating new coefficient values to the transmitter via the back-channel until a time limit has been reached. Once the time limit has expired, the receiver determines if one or more performance metrics have been met, e.g., eye opening, bit error rate, jitter characteristics, etc. If the performance metrics are not met, then the receiver forces the transmitter to fall back or "down shift" to a slower speed protocol that might also require TXFIR adaptation. If the criteria are met, then the receiver begins other time-consuming initialization processes or begins normal operation. Unfortunately, the time limit for the various protocols can be unnecessarily long (e.g., 24 milliseconds (ms) for PCIe Gen3 and 500 ms for 10GBASE-KR) if successful adaptation occurs well before the time limit expires. The unnecessary adaptation time can cause significant, undesirable delay before normal communication operation begins, particularly when multiple adaptation attempts are made.

Therefore, designers attempt to provide a receiver that can quickly adapt the TXFIR coefficients and determine if the coefficient values have converged to values to allow for the receiver to terminate the adaptation process during initialization before the protocol-specified time period expires, thereby shortening the initialization period of the transmitter and the receiver.

In general, circuit gain dynamic range drops as temperature increases. The receiver is typically adapted at much lower temperature at system start up time, but the operating temperature of the system is generally much greater than the temperature at which the adaptation was performed. The receiver circuit variation over process/voltage/temperature (PVT) results in receiver signal gain variation. The situation for the case when the receiver VGA reaches its maximum value is similar for when the receiver VGA reaches its minimum value. If, at initial adaptation time, the full range of the VGA is utilized then the receiver's circuitry does not have any additional range left to support gain update at steady state operation. As an example, initially the receiver is adapted at sub-100 degree centigrade, and fully utilizes its entire AGC range. At a later time when the circuit heats up to 125 degree centigrade and the received signal is attenuated below desired target operating amplitude range, then the receiver has no room to enhance its operating performance under such PVT condition. Also, at higher operating VGA gain the receiver's effective Nyquist gain is reduced, causing a reduction in effective equalization capability of the receiver.

SUMMARY

This Summary is provided to introduce a selection of concepts in a simplified form that are further described below in the Detailed Description. This Summary is not intended to identify key features or essential features of the claimed subject matter, nor is it intended to limit the scope of the claimed subject matter.

One embodiment of the invention allows for joint adaptation of transmitter and receiver coefficients during an initial adaptation period. Serialized data from a transmitter is received from a channel, the transmitter having at least one adjustable transmitter coefficient. Gain is applied to the serialized data by an amplifier having at least one adjustable gain coefficient, wherein the gain is within a defined gain range of the amplifier. A gain update value is determined for the amplifier having at least one adjustable gain coefficient. A transmitter mapper tests whether the determined gain update value is within a subset range of the defined gain range of the amplifier; and if the determined gain update value is outside of the subset range, the transmitter mapper translates the gain update value into a transmitter update request, the transmitter update request including at least one adjustable transmitter coefficient value.

BRIEF DESCRIPTION OF THE DRAWINGS

Embodiments of the invention will become more fully apparent from the following detailed description, the appended claims, and the accompanying drawings in which like reference numerals identify similar or identical elements.

FIG. 4 is a table used to set loop gain and convergence window sizes according to one embodiment of the invention;

FIG. 9 illustrates translation of an additional RX gain request corresponding to the receiver gain update to a transmitter amplitude gain update;

FIG. 10 shows a simplified block diagram of functional elements from the system of FIG. 1 for the initial adaptation period process as described with respect to FIG. 6; and FIG. 11 shows an exemplary table for SAS transmitter coefficient requests and corresponding transmitter circuit response.

DETAILED DESCRIPTION

Figure 1:
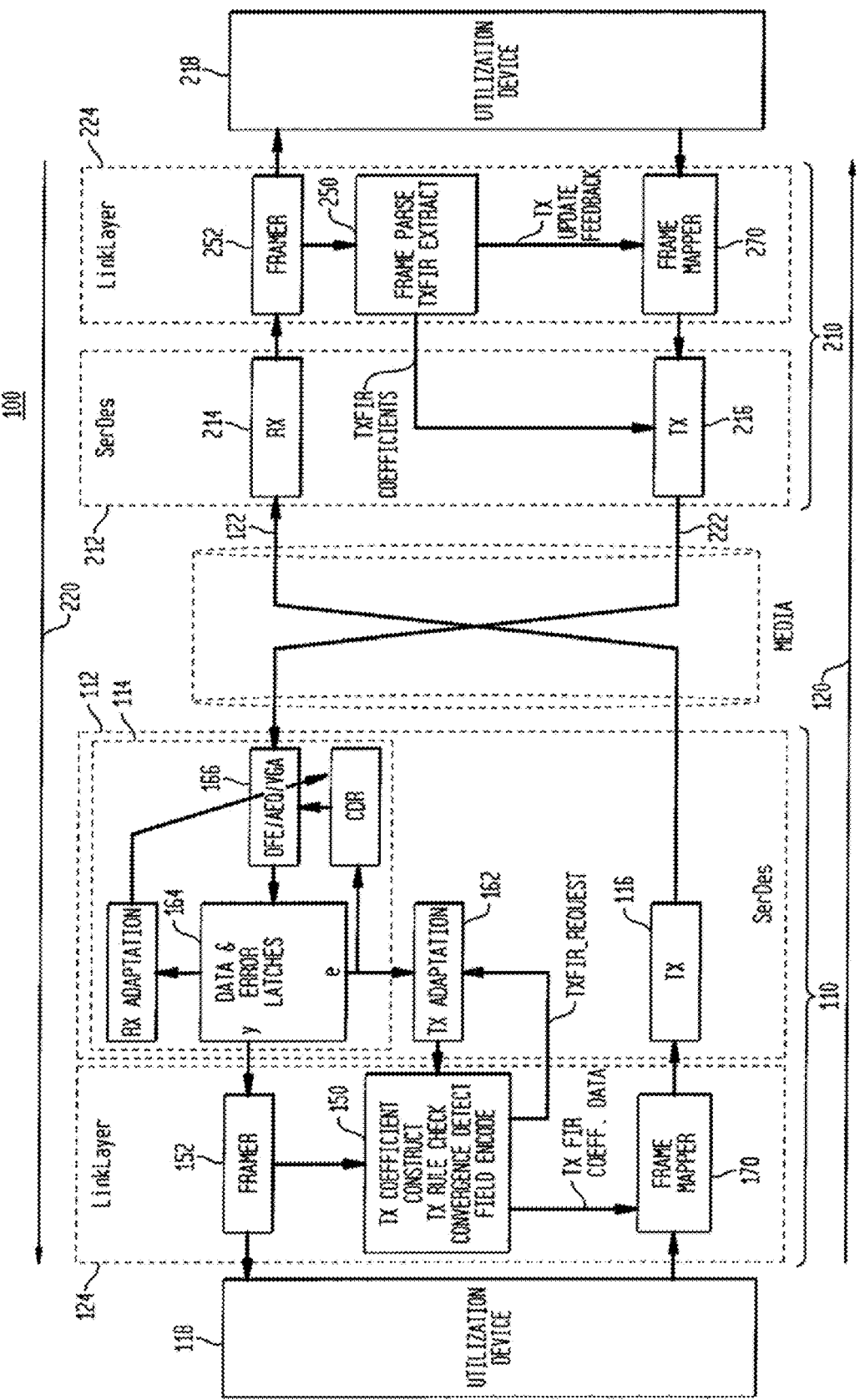
FIG. 1 is a simplified block diagram of a bidirectional communication system incorporating one or more embodiments of the present invention.

As data rates increase for, for example, serializer/deserializer (SERDES) communications applications, the "quality" of the channel media degrades dramatically even over short distances between the ends of the channel. One technique typically used to overcome the poor quality channel and achieve the desired channel performance needed for reliable communications over the degraded channel is to pre-distort the transmitted signal to counteract the effects of the channel on the signal presented to the receiver. For high-speed signaling applications, such as 8 Gbps and faster SERDES applications, the pre-distortion characteristics are adjusted through a back or reverse channel to adapt the pre-distortion to the channel's characteristics.

Embodiments of the present invention allow for adjustment of transmitter amplitude during joint transmitter (TX) and receiver (RX) equalization. During joint TX and RX adaptation, when the receiver requires a gain update, the receiver gain update is masked above or below a preset range. The RX gain update (instruction) is encoded into a transmitter amplitude update (instruction) transferred through back channel communication. The translation of RX gain to TX amplitude update is performed after the RX gain reaches a specified range. The objectives of such masking, encoding and translation is to reserve a certain amount RX gain range to combat RX gain variation due to process, voltage, and temperature (PVT) changes over time, and also to offer better linear equalization in the receiver over a constrained VGA bandwidth.

Specifically, during a back channel adaptation process (described subsequently below), a process in accordance with embodiments of the present invention phase limits the receiver's VGA gain update range. If the receiver gain update reaches an upper threshold (or bound), any additional RX gain request is translated to a transmitter amplitude gain update. Transmitter amplitude gain is generally controlled via three parameters, described subsequently as C0, CM1 and CP1. A RX gain update increase translates to a C0 increase, which also accordingly scales up CM1 and CP1. If the transmitter amplitude reaches either of the lowest and highest amplitude bounds, the TX update request is not honored and a not updated feedback signal is sent to the receiver.

Embodiments of the present invention might provide the following advantages during an initial start-up period of, for example, a SERDES IC. Since circuit gain dynamic range drops as temperature increases, and the receiver is typically adapted at much lower temperature at system start up time, embodiments of the present invention avoid lower performance and adaptation errors for when the operating temperature of the system is much greater than the temperature at which the adaptation was performed. Embodiments of the present invention correct for receiver circuit variation over process/voltage/temperature (PVT) results in receiver signal gain variation. Such embodiments might be particularly useful for, for example, SERDES devices operating in 12G SAS systems.

For ease in understanding described embodiments, an exemplary bidirectional communication system employing embodiments of the present invention is described with respect to FIG. 1. In addition, FIGS. 2-5 illustrate the transmitter and transmitter filter update and adaptation process for the exemplary bidirectional communication system of FIG. 1.

FIG. 1 is a block diagram of a typical bidirectional communication system 100 that incorporates two ports connected by channel media. One port is referred to herein as a local port 110 and the other as a link partner port 210, which ports are also variously referred to in standards as downstream and upstream ports, respectively. The local port 110 controls the link partner port 210 through the use of special data frames. Both ports have a link layer and a SERDES transceiver. The link layer is a well-known function (e.g., layer two of the seven layer International Organization for Standardization's Open System Interconnection communications system model) that provides the interface between a utilization device that sinks and sources data, and the SERDES. The link layer implements the protocol of the standard being used. The SERDES converts parallel data to serial data and vice-versa for transmission over channel media, such as but not limited to a backplane, metal traces in a substrate, a cable, or a combination thereof.

For purposes here, both ports contain substantially the same functional blocks so that the description herein of functional blocks in one port is applicable to the other port. However, it is understood that ports of different capability, e.g., communication speed, can be used to communicate with each other but might be lacking certain features, e.g., a transmit filter with variable coefficients or a receiver without an analog equalizer.

In the local port 110, the SERDES 112 has a receiver portion 114 and a transmitter portion 116. The SERDES 212 in the link partner port 210 has a receiver portion 214 and transmitter portion 216. The transmitter 116 sends serialized data from a data source in utilization device 118 to the receiver 214 via the aforementioned channel media 122 for delivery to a data sink in the utilization device 218, forming a communication channel 120. Similarly, the transmitter 216 sends serialized data from a data source in utilization device 218 to the receiver 114 via the aforementioned channel media 222 for delivery to a data sink in the utilization device 118, forming a communication channel 220.

A utilization device might be a computer, a field-programmable gate array, a storage system, another communication system, or any other device that produces or consumes data. For purposes of this description, a communication channel is a main channel when the channel is carrying either data from one utilization device to another or conveying data during training as will be explained in more detail below, or the communication channel is a back-channel when conveying information regarding the setup, adaptation, or other data related to the operation of the main channel. A channel might be both a main channel and a back-channel during normal operation; e.g., channel 120 might be conveying data from utilization device 118 to utilization device 218 while conveying configuration or performance information (e.g., bit error rate) about the channel 220 to a controller located in the local port 110.

Figure 2:
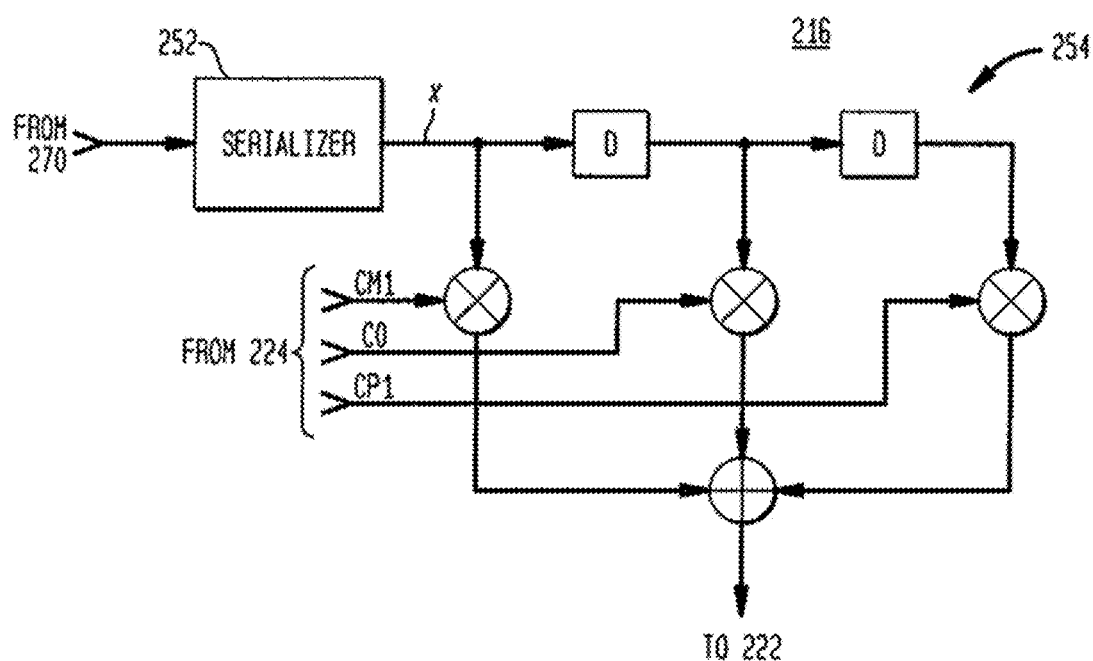
FIG. 2 is a simplified block diagram of an exemplary implementation of the transmitter portion of FIG. 1.

As will be explained in more detail in relation to FIG. 2, the transmitters 116, 216 each contain a serializer that converts parallel data from the respective link layer into serial data that is filtered by a transmit filter with adjustable coefficients, and the filtered serial data is driven onto the respective communication media. The receivers 112, 212 might be of the type disclosed in U.S. Pat. No. 7,616,686, incorporated by reference herein in its entirety. Briefly, when instructed to do so, a receiver adapts to received data by recursively adjusting the equalizers therein (analog and digital if present) to minimize the error values related to the difference between transmitted data and data decoded by the receiver. The error values represent the quality of signals passing through the communication channel, including all equalizers and filters that the signal passes through. As will be explained in more detail below, the error values from a receiver are also used as input to a process that adapts the transmit filter of the transmitter coupled to the receiver via the respective communication media to further improve the performance of the system 100.

Data to be transmitted is filtered through a transmit filter disposed between a serializer and the communication media to improve the performance of the system 100 by pre-distorting the signals applied to the conductors in the channel media. FIG. 2 shows an exemplary embodiment of the transmit portion of the SERDES 212, here a serializer 252 and an FIR (TXFIR) filter 254. In this embodiment of FIG. 2, frame mapper 270 in link layer 224 (FIG. 1) drives the serializer 252 that, in turn, drives the TXFIR filter 254. The TXFIR filter 254 has three coefficients or parameters: C0, CM1, and CP1 (referred to herein as the main cursor, pre-cursor, and post-cursor, respectively). As described in more detail below, a recursive adaptation algorithm performed in the local port 110 determines the values of the three TXFIR coefficients and these values are transmitted to the port 210 via channel 120 acting as a back-channel and are then loaded into the TXFIR 254 by the link layer 224. The recursive algorithm uses a signal related to the quality of a received signal having a decision-directed detected data pattern and iteratively adjusts the coefficients based on a filtered gradient of the received signal.

An alternative exemplary TXFIR filter is disclosed in "A 1.0625-to-14.025 Gb/s Multimedia Transceiver with Full-rate Source-Series-Terminated Transmit Driver and Floating-Tap Decision-Feedback Equalizer in 40 nm CMOS" by Quan et al., Proceedings of the 2011 IEEE International Solid-State Circuits Conference, pp 348-349, incorporated by reference herein in its entirety. The coefficients of Quan's FIR filter might be adjusted as described for the TXFIR in FIG. 2. The above description of the transmitter 216 also applies to the transmitter 116 (FIG. 1). Similarly, the adaptation process described herein is equally applicable to adapting the TXFIR filter (not shown) in the SERDES 112.

When a request is made to adapt the coefficients of TXFIR filter 254, a controller 150 in the local port 110 sends a request for TXFIR adaptation, TXFIR_REQUEST, to transmit (TX) Adaptation unit 162 in the SERDES 112. While the TXFIR_REQUEST signal is asserted (and as described in more detail in connection with FIG. 3), the TXFIR adaptation gradients for pre-cursor (CM1), main-cursor (C0), and post-cursor (CP1) are accumulated over a given period in the TX Adaptation unit 162 utilizing an error value, e, from the receiver 114. For purposes herein (and as described in more detail in connection with FIG. 5), the error value e is a signal related to a difference between each data bits decoded by the receiver 114 (output y from data and error latches 164) and the signal received from the communication media 212 after being processed by the equalizers in block 166. During the time TXFIR_REQUEST is asserted, the receiver 114 can optionally adapt its variable gain amplifier (VGA), analog equalizer (AEQ), and the decision feedback equalizer (DFE) in block 166. Once the TXFIR_REQUEST signal is de-asserted the accumulated gradient for pre-cursor, post cursor, and the main cursor are evaluated. Based on the gradient evaluation results, the TXFIR coefficient updates will be determined by controller 150.

The ports 110, 210 process the TXFIR filter coefficient update information differently depending on the standard being implemented. In the aforementioned PCIe standard, the TXFIR filter coefficients are calculated following a certain set of rules (as explained in more detail below in connection with FIG. 5) which are communicated to the link partner port 210 by encoding the transmitter coefficients in an outbound training sequence (TS1) order set frame in frame mapper 170 and sent via channel 120 operating as a back-channel. In the aforementioned SAS-3, 16GFC, and 10 GBASE-KR standards, the coefficient increment or decrement information is encoded in the outbound coefficient update field of a training frame sent to the link partner port 210 via channel 120 operating as a back-channel. The controller 250 and framer 252 parse the received transmitter update information and update the TXFIR coefficients in transmitter 216 provided the allowed range limit for the coefficients has not been reached. After an update has taken place, the link partner port 210 will provide feedback to the local port 10 through channel 220 using an outbound training frame that might have known training data therein. In PCIe standard, the updated transmitter coefficients will be broadcasted back in the above-mentioned TS1 order set. In SAS-3, 16GFC, and 10G-KR standards, the transmitter update feedback information will be encoded in the status report field of the training frame indicating a successful update, or no update yet, or the transmitter coefficient reached its range limit.

Once the new transmitter coefficients are activated in the TXFIR, the receiver 114 might readapt the VGA, AEQ, and DFE coefficients during a programmed amount of time while the TXFIR_REQUEST is de-asserted. After an appropriate amount of time is allocated for the receiver 114 to reacquire the change in dynamics of the transmitter 216 due to the TXFIR coefficient changes, the TXFIR_REQUEST might be reasserted to start another cycle of the link partner port transmitter adaptation. The lower bound of the TXFIR_REQUEST de-assertion time might be dictated by the greater of (a) summation of the (1) coefficient update information encoding delay in the local device, (2) two times the communication media delay, (3) coefficient information decode and provisioning delay in the link partner port 210, (4) the update feedback decoding delay in the local port 110, or (b) the time taken by the receiver 114 to readapt its VGA, AEQ, and DFE coefficients following the TXFIR coefficient update in accordance, for example, with the above-identified U.S. Pat. No. 7,616,686.

Back-channel transmitter adaptation typically ends when the TXFIR coefficients have converged. Various convergence detection schemes can be employed for this purpose. If the convergence is not detected within the allocated time, the back-channel adaptation will end with a timeout established by a timer TIMEOUT_TIMER. In accordance with the aforementioned PCIe standard, the maximum allocated back-channel adaptation time is limited to 24 ms, while in the aforementioned SAS-3, 16GFC, and 10G-KR standards, the time limit is 500 ms.

Figure 3:
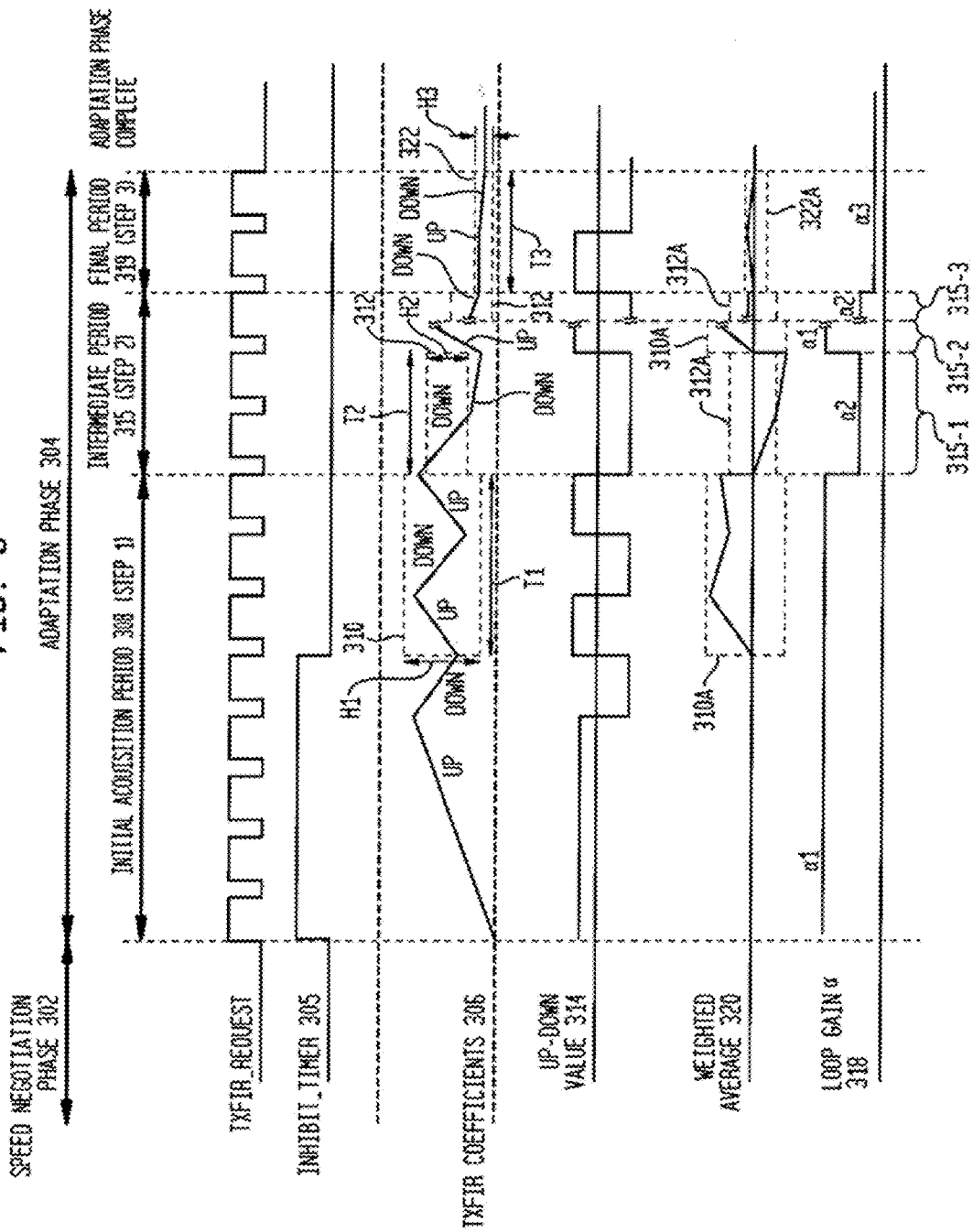
FIG. 3 is a simplified timing and signal diagram illustrating a transmit filter coefficient adaption process and illustrating techniques of detecting convergence of transmit filter coefficients according to alternative embodiments of the invention.

An exemplary operation of the adaptation process in accordance with the present invention is illustrated in FIG. 3. For purposes of this description, the operation is described in connection to the aforementioned PCIe standard but may be applied to any of the above-mentioned standards. Adaptation of the transmitter 116 can be done using the same process as described but for purposes of simplicity, adaptation of transmitter 216 is described herein.

Beginning in the speed negotiation phase 302, the local port 110 and the link partner port 210 (FIG. 1) negotiate with each other the speed of the channels 120 and 220. In essence, the ports negotiate the highest speed that the channels can communicate and is typically determined by the hardware limitations of the respective ports. Generally, phase 302 is accomplished using prearranged TXFIR coefficients or last used coefficients for the TXFIR filter 254 (FIG. 2) and the equalizers in block 166 of the receiver 114 (FIG. 1). An example of this can be found in the aforementioned PCIe standard regarding phases zero and one in the initialization process described therein. Reference may be made to the PCIe standard or any of the other aforementioned standards for a more complete understanding of the speed negotiation phase.

Once the speeds of the channels are set, an adaptation phase 304 is initiated in which the equalizers and filters in the ports adapt to each other and to the communication media 122, 222 such that the channels 120, 220 operate at high-speed with a low error-rate. In one embodiment, the adaptation phase 304 begins with the initial assertion of the TXFIR_REQUEST signal discussed above that initiates the beginning of the INHIBIT_TIMER 305 and begins adjustment of the TXFIR filter coefficients 306. The INHIBIT_TIMER 305 is used to guard against premature exit from transmitter adaptation that might happen due to training data pattern-dependent adaptation jitter or dither during an initial acquisition period 308 of the adaptation phase 304. A typical value for this timer is 10 ms or more but less than that of the TIMEOUT_TIMER discussed above. At the beginning of the adaptation phase 304 and in this example, the INHIBIT_TIMER timer is initialized and the output of the timer is asserted. As long as signal 305 is asserted, the below-described convergence criterion will not be applied to allow sufficient time for an initial transmitter coefficient adaptation to take place. Once convergence in the TXFIR coefficients 306 is detected using a "coarse" criteria described below, then the initial acquisition period 308 ends and a more refined criteria is used to determine if the adaptation phase 304 is complete.

In this embodiment, the controller 150 (FIG. 1) adjusts the TXFIR coefficients by increasing (UP) or decreasing (DOWN) the coefficients as described below. Also in this embodiment, the UP and DOWN signals 314 have a value of either a +1 or a −1, respectively, and are weighted (multiplied) by a loop gain value α (318) before being added to the coefficient values 306. As shown in FIG. 3, the TXFIR coefficient 306 is increased by α when UP is asserted and is decreased by α when DOWN is asserted. As described below, the weighted UP and DOWN values can be used in determining whether or not the TXFIR coefficients have converged. Other approaches to adjust the TXFIR coefficients may be used as desired.

A convergence evaluation window is used after the INHIBIT_TIMER is de-asserted to determine if the TXFIR coefficient 306 has converged. The size (height H, corresponding the threshold used for determining convergence, and temporal length or width T) of the first convergence evaluation window 310 is relatively large during period 308. In one exemplary embodiment, if the peak-to-peak TXFIR coefficient values 306 fall within the height of the window 310, then convergence is declared and the initial acquisition portion 308 ends. An intermediate phase 315 is begun using a new, less coarse window 312 that is smaller than the coarse initial window 310 e.g., H2<H1 and T2<T1), along with a new adaptation loop gain α2 that smaller than the adaptation loop gain α1. The new window and loop gain value is then used for the further refining the TXFIR coefficients. Generally, all of the TXFIR coefficient values should be within the window 310 for convergence. Thus, if all but one of the coefficient values is within the window then the initial acquisition portion 308 will continue until the other coefficients also converge.

Several techniques can be used to determine convergence, two of which are described here. As mentioned above, one technique is to track the peak-to-peak values of the TXFIR coefficient values 306 within an evaluation window so that the coefficients are deemed to have converged if the value of the coefficient does not exceed the window boundaries. An alternative technique utilizes separate accumulators (not shown) for each of the TXFIR coefficients 306, each accumulator separately accumulating or averaging the loop gain-weighted UP and DOWN correction values (as described above) during an evaluation window. Alternatively, each accumulator might separately accumulate non-weighted UP and DOWN correction values and set the window height accordingly. If by the end of the convergence window the averaged value has not exceeded the height (threshold) of the window, then the coefficient is deemed converged. In the example in FIG. 3, the accumulated loop gain-weighted values (320) for one of the TXFIR coefficients are illustrated with respect to an initial evaluation window 310A (corresponding to the window 310). At the end of the window 310A, the value of the weighted values does not exceed the window height and, thus, the TXFIR coefficient has converged. At the end of each evaluation window, the accumulated value 320 is reset to zero.

In this embodiment, the adaptation loop gain value 318 is largest during the acquisition period 308 and, generally, a smaller value or values are used during the remainder of the adaptation phase 304, resulting in generally smaller UP and DOWN values as the adaptation phase 304 progresses. Concomitantly with the changing of the loop gain 318, the size of the window is changed to have a smaller height or amplitude H and/or a shorter temporal length T as appropriate. For example, window 310 has a height H1 and length T1 and smaller window 312 has a height H2 and a length T2, T2<T1 and H2<H1. It is understood that, for example, the length of the window might not change (e.g., T1=T2) but the height is usually decreased as the window gets smaller. Because the relatively large UP and DOWN values during period 308 causing rapid changes in the coefficient values that might result in a local minima in the changes to the coefficient values, the probability of a false convergence is reduced by having the width T1 of the first window longer than the remaining windows.

A tabular example of the loop gain and window sizes might be as shown in FIG. 4, and the values might be stored in a memory or might be calculated dynamically. Here, in Step 1, the initial values (α1 and the size of window 310) for the acquisition period 308 are stored. Once the period 308 ends, then in Step 2 a new adaption loop gain α2 and window size, such as window 312, is used. Once convergence occurs using the values in Step 2, then values of a still smaller window (T3, H3) and a smaller adaptation loop gain α3 in Step 3 might be used. While three Steps are shown in FIG. 4 and are illustrated in FIG. 3, more Steps might be used as required.

Returning to FIG. 3, after the initial or acquisition period 308 ends, then an intermediate period 315 begins. In sub-period 315-1 a new window 312 is retrieved from Step 2 in the table in FIG. 4. The window 312 is used to determine if convergence occurs using smaller weighted UP and DOWN values changing the coefficient values because the new, smaller loop gain α2 being used to weight the UP and DOWN values 314. In this example, the TXFIR coefficient value 306 exceeds the window 312 and no convergence occurs, further evidenced by the accumulated weighted values 320 exceeding the height of window 312A. As will be described in more detail below regarding FIG. 5, since no convergence was detected, adaptation is again attempted but with the window and loop gain returning to the values of Step 1 as shown in sub-period 315-2. Assuming here convergence was achieved in sub-period 315-1, the window 312 and adaptation loop gain α2 is used in sub-period 315-3. Once convergence occurs using window 312 in sub-period 315-3, the intermediate period 315 ends and a new, final period 319 begins, using a new gain 3 and window 322 length (T3) and height (H3) as retrieved from Step 3 in the table in FIG. 4, the new window 322 having the same temporal length (T3=T2) as the window 312 but with a smaller height (H3<H2) than window 312, although a different length (e.g., T3<T2) might be used. When the coefficients 306 are within the window 322 and convergence is detected, the adaptation phase 304 is terminated. It is understood that additional gain and window size convergence Steps might be used. By using multiple loop gains and convergence windows, a faster convergence of the coefficient values might be accomplished than by using only one gain value α. Further, the described techniques allow for the possibility for an adaptation process that completes before the TIMEOUT_TIMER expires.

Figure 5:
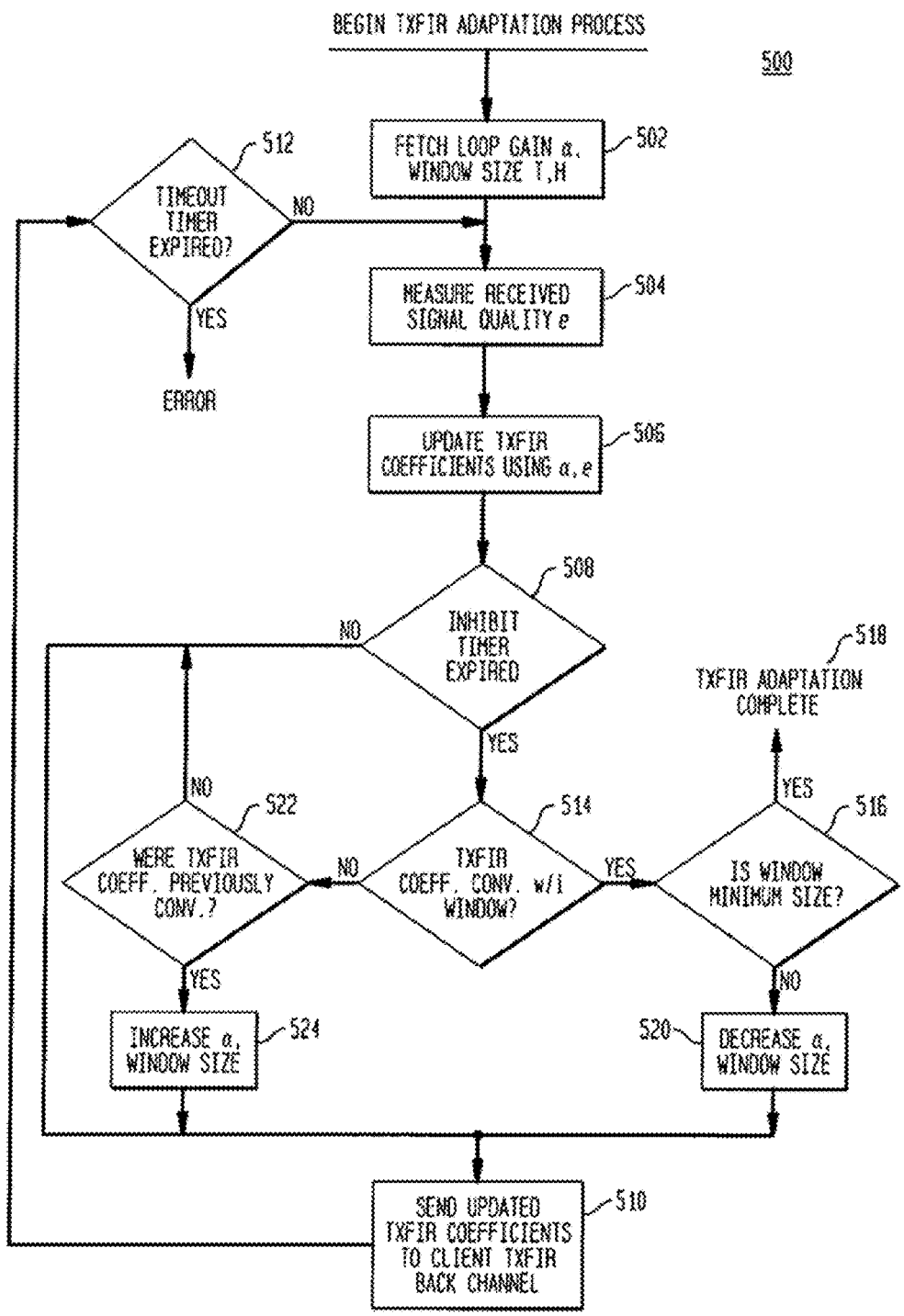
FIG. 5 is a flowchart of the process of adapting transmit filter coefficients using back-channel communication as illustrated in FIG. 3 according to one embodiment of the invention.

Referring to FIG. 5, the adaptation process 500 that occurs with each assertion of the TXFIR_REQUEST signal in FIG. 3 is shown in a flowchart form in accordance with one embodiment of the invention. The process described herein is used to recursively adjust the TXFIR coefficients is assumed to be independent of the various adaptation algorithms used to adjust the AEQ and DFE coefficients in the receiver 114 (FIG. 1). Also in this embodiment, the TXFIR coefficients are adapted while the AEQ and DFE coefficients are held constant but might also adapt concurrently with the TXFIR coefficient adaptation process described above. In this embodiment, the controller 150 and the TX Adaptation unit 162 implements the described process. In other embodiments the described process can be implemented in another controller in the port 110.

With each assertion of TXFIR_REQUEST as described above and beginning with step 502, the adaptation loop gain value α, convergence window values (temporal length T and amplitude height H as explained in more detail below) are retrieved from a table in memory or the like as described in more detail regarding FIG. 4. The gain and window values might instead be calculated from the previously used values, e.g., the gain value might be set to one-half the previous gain value, and the window might have a smaller height and/or shorter length compared to the previous window as appropriate. Next, in step 504, the quality of the signal received by the receiver 114 (FIG. 1), e, is obtained from the receiver 114 by the TX Adaption unit 162. Then in step 506, the TXFIR coefficients are updated using α and e. How the coefficients are updated is explained herein.

For purposes here, it is assumed that the AEQ and DFE coefficient taps are held constant during the TXFIR adaptation process, and the equivalent response of the channel, VGA, AEQ, and DFE can be described as:

$$H_{eq} = KHZ^{-L}, \qquad (Eq. 1)$$

where K is the composite gain, H is the convolution of all impulse responses between the transmitter and the final output d, and $Z^{-L}$ is the total delay between the transmitter and output. The desired final output is delayed input might be represented as:

$$d = x \cdot Z^{-L}, \qquad (Eq. 2)$$

where x is the signal applied to the TXFIR 254 from the serializer 252 (FIG. 2) and the error value is represented as:

$$e = d - y, \qquad (Eq. 3)$$

where y is the output of the TXFIR filter 254 and can be additionally expressed as follows:

$$u = X^T \cdot H_{eq} \qquad (Eq. 4a)$$

$$y = U^T \cdot W \qquad (Eq. 4b)$$

where u is a bit (a decision bit) derived from time-aligning bits x with the output y as well as the error value e, $X^T$ is the vector of known data bits x that are transmitted during adaptation, and W is the vector of current transmitter FIR tap vector. Representing the samples at time k, yields:

$$X_k = [x_{k-0}, x_{k-1}, x_{k-2}] \qquad (Eq. 5)$$

$$U_k = [u_{k-0}, u_{k-1}, u_{k-2}] \qquad (Eq. 6)$$

and $$W_k = [w_{k-1}, w_{k-0}, w_{k+1}]^T \qquad (Eq. 7)$$

The mean square error is represented as:

$$\epsilon = E[e_k^2] \qquad (Eq.\ 8)$$

Where E[.] is the well-known expected value function. For the purpose of developing a recursive adaptive updates scheme for the transmitter coefficients, $e_k^2$ is used as an estimate for e. Thus at each iteration in the adaptation process the gradient estimate is of the form:

$$\nabla_k \begin{bmatrix} \frac{de_k^2}{dw_{k-1}} \\ \frac{de_k^2}{dw_k} \\ \frac{de_k^2}{dw_{k3-1}} \end{bmatrix} = 2e_k \begin{bmatrix} \frac{de_k}{dw_{k-1}} \\ \frac{de_k}{dw_k} \\ \frac{de_k}{dw_{k4-1}} \end{bmatrix} = -2e_k U_k^T \qquad (Eq.\ 9)$$

Thus the adaptive transmitter tap update algorithm can now be expressed as:

$$\left.\begin{array}{l} W_{k-1} = W_k - \mu_n \nabla_k \text{ or} \\ W_{k-1} = W_k + \alpha e_k U_k^T \end{array}\right] \qquad (Eq.\ 10)$$

Where n=1, 2, 3, . . . , and $\alpha=2\mu_n$ is defined as the adaptation loop gain.

In the event the receiver approximately equalizes the channel, then $U^Y \cong X^Y Z^{-L}$, where $Z^{-L}$ is delay needed to time-align (delay) data bits x generated by the receiver with the actual transmitted data bits presented to the TXFIR filter. Because the bits x presented to the TXFIR have a sequence or pattern known to the receiver during adaptation and the delay from the input to the TXFIR to the output bits y is also known to the receiver, the receiver constructs $X^T$ and $Z^{-L}$ accordingly, effectively generating $U^T$, to generate the next set of TXFIR coefficients in accordance with Eq. 10. After the above-described decision-directed adaptation completes, then $X^Y \cong Y^Y$.

In one embodiment, the gradient defined in Eq. 9 is accumulated in an accumulator of length N. In another embodiment, there are three such accumulators, one for the pre-cursor coefficient, another for the post-cursor coefficient, and one for the main cursor coefficient. Before the gradient is accumulated, it is given a gain of $2^M$, where M is an integer $1 \leq M \leq N$ and, in one example, N equals thirteen. The accumulation continues for a time that the TXFIR_REQUEST signal (FIG. 3) is asserted. If during this time the accumulator overflows when greater than $2^N-1$ or underflows when less than $-2^N$, then a corresponding UP or DOWN indication is generated to increase or decrease the transmitter pre-cursor or post-cursor coefficients. When the accumulator reaches a maximum value, then an UP indication or signal is generated, and when the accumulator falls below a minimum value, a DOWN indication or signal is produced. In one example, the maximum value might be $2^{23}-1$, and the minimum value might be $-2^{23}$. In the aforementioned PCIe standard, the transmitter training period is limited to 24 ms. As a result to have reasonable number of updates to the TXFIR coefficients, it is desirable to limit the duration the TXFIR_REQUEST is asserted but with an increase the gain factor α. For SAS-3, 16GFC, or 802.3ap standards, the adaptation is longer, 500 ms, where the TXFIR_REQUEST duration can be extended and the adaptation gain can be reduced. This adaptation gain vs. accumulation time trade off can be programmed to meet the application need for increasing adaptation speed or to lower adaptation jitter noise.

Returning to FIG. 5, in step 508 the INHIBIT_TIMER is checked to see if it has timed out. If it has not, then the updated TXFIR coefficients are sent to the link partner TXFIR in step 510. Then in step 512 the TIMEOUT_TIMER is checked as a sanity check and, if the timer has not timed-out, control passes back to step 504. If, however, the TIMEOUT_TIMER has timed-out, then an error has occurred and the adaptation process terminated.

If the INHIBIT_TIMER has timed-out, then control from step 508 passes to step 514 where the TXFIR coefficients are checked to see if they have converged, in this embodiment and as explained above, the if the TXFIR coefficients stay within a range of amplitudes for a given time period that defines the window, then the adaptation process is considered converged for that adaptation gain value and window size set. If the coefficients are converged for the given window, then in step 516 the widow is checked to see if it is of minimum size and, if so, then the adaptation process is complete in step 518. If the coefficients have not converged, then control passes to step 520 and the adaptation loop gain α and the size of the window is decreased in step 518 by selecting the next gain/window size set as shown in FIG. 4, and control passes to step 510, described previously.

Returning to step 514, if the coefficients have not converged, then in step 522 if convergence occurred using a previous α and window size set, then the adaptation begins again using a larger gain α and bigger window selected in step 524 by selecting the previous gain/window size set as shown in FIG. 4 and described above regarding sub-period 315-1 in FIG. 3, and control passes to step 510, described previously. If, however, there was no earlier convergence, then control passes from step 522 to step 510 to continue adjustment of the coefficient values until convergence occurs.

As shown further below, when the VGA gain increases, the effective equalization decreases due to band limiting effect with higher VGA gain settings. Consequently, employing one or more embodiments of the present invention to maintain the VGA gain setting within a subset range during the initial adaptation process (which is typically at lower temperature) allows for maintaining a relatively lower VGA gain over time from initial, intermediate and final period adaptation, and so provides for a relatively higher effective gain for the receiver.

Figure 6:
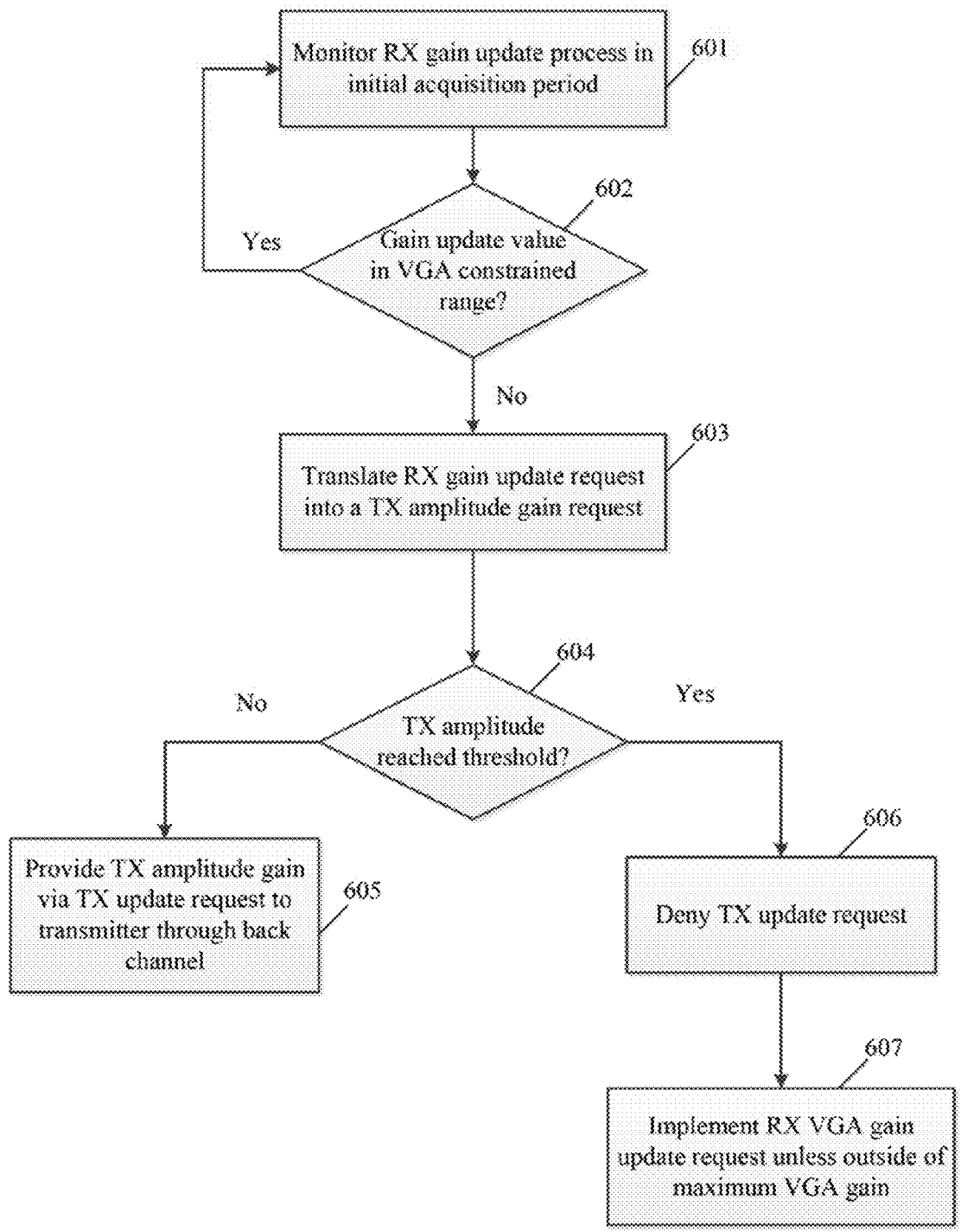
FIG. 6 shows an initial adaptation period process to mask receiver gain updates to account for process, voltage, temperature (PVT) variations in accordance with embodiments of the present invention.

Having described the back channel adaptation process for the system of FIG. 1 with respect to FIGS. 2-5, modification of the initial adaptation period process in accordance with embodiments of the present invention is now described with respect to FIG. 6. Such modification as shown in FIG. 6 might occur in parallel with steps of FIG. 5, and before the step 510. Specifically, during back channel adaptation, the receiver VGA gain update range is phase limited during initial back channel adaptation time as follows.

Figure 7:
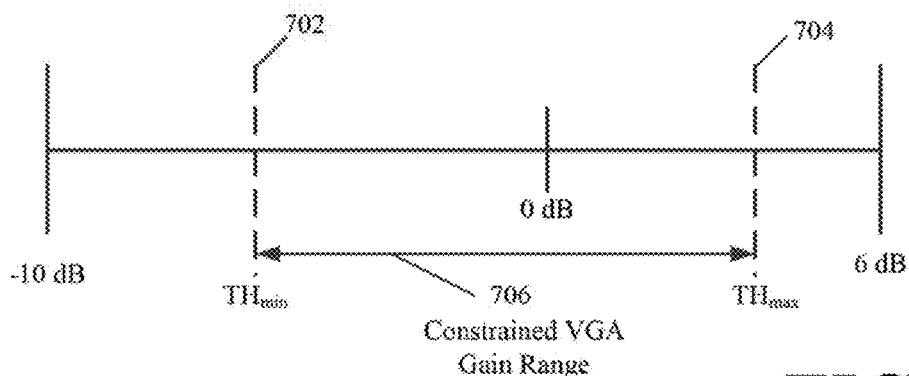
FIG. 7 shows a constrained predefined range as a subset of the maximum available range of the receiver's VGA.
Figure 8:
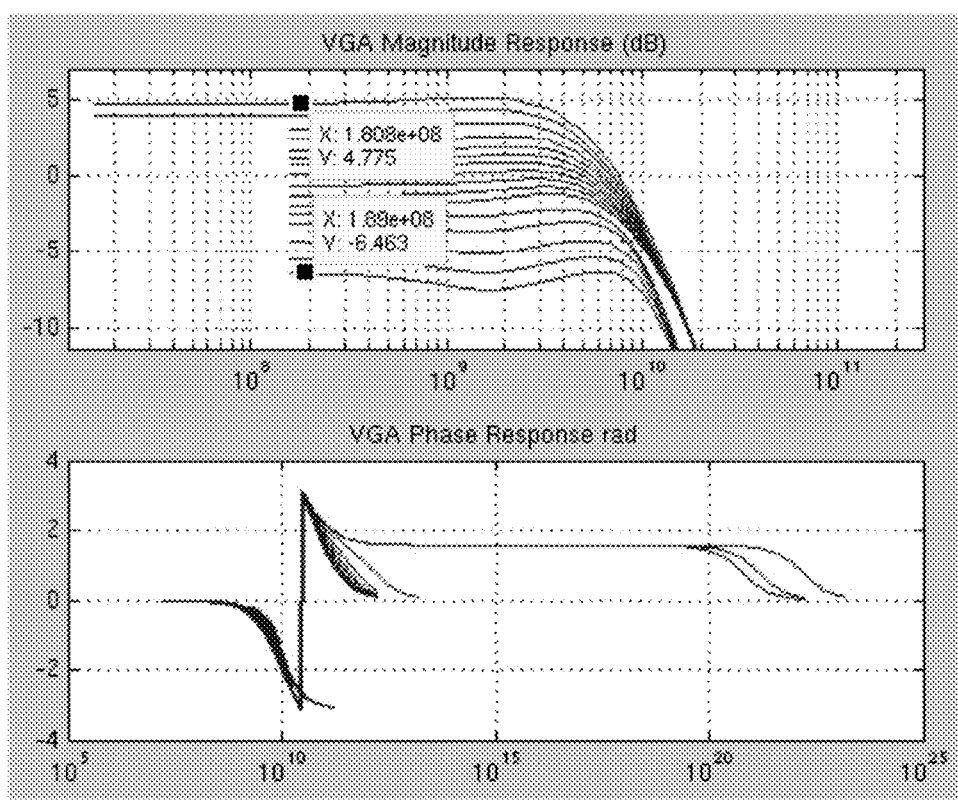
FIG. 8 illustrates an exemplary VGA frequency response from which the subset of FIG. 7 might be derived.

At step 601, if the state of the receiver indicates that the receiver is in the initial acquisition period, the receiver's RX gain and the receiver gain update process are monitored. At step 602, a test determines if the receiver's current gain update request value at present is within a predefined range (i.e., within the VGA constrained range) at which point the process returns to step 601), or if the receiver gain update has reached a threshold (at which point the process advances to step 603. Such predefined range is constrained to a subset of the maximum available range of the VGA as shown in the FIG. 7. As shown in FIG. 7, the constrained range 706 might be defined by a lower threshold $TH_{min}$ 702 and a upper threshold $TH_{max}$ 704 within the overall −10 dB to 6 dB operating range of the VGA. FIG. 8 illustrates an exemplary VGA frequency response from which the subset of FIG. 7 might be derived.

If, at step 602, the test determines that the receiver gain update reached either an upper or a lower threshold, at step 603, the RX gain request corresponding to the receiver gain update is translated to a transmitter amplitude gain update, as shown in FIG. 9. As shown in FIG. 9, when the update request is outside of constrained range 706, two regions, lower bound region 902 and upper bound region 904, are left within the operating range of the VGA. Lower bound region 902 corresponds to translation of the RX gain update request to a decrease in transmitter amplitude request, and upper bound region 904 corresponds to translation of the RX gain update request to an increase in transmitter amplitude request.

A transmitter (TX) mapper coupled to the link layer (LL) evaluates the VGA and the transmitter settings along with the knowledge of the remote partner's (i.e., transmitter port's) current transmitter amplitude settings. The TX mapper might be implemented through a dedicated controller or state machine, or might be integrated with other functions of a more general controller implemented within, for example, the SERDES system. The TX mapper translates the VGA information into transmitter amplitude control setting with the knowledge of the transmitter's current amplitude indication that the LL receives from its link partner. Thus, the receiver VGA adaptation algorithm adapts the VGA value and the transmit adaptation algorithm determines the transmitter cursor values (e.g., the main-cursor (C0) is determined, and then scales the pre-cursor (CM1) and post-cursor (CP1) parameters accordingly).

FIG. 10 shows a simplified block diagram of functional elements from the system of FIG. 1 for the initial adaptation period process as described with respect to FIG. 6. Transmitter (TX) 1002 provides data symbols through channel 1004. Receiver (RX) VGA 1006 applies gain as described above, which might be set by algorithms of both a TX mapper 1008 and a VGA adaptation module 1010, depending on LL 1012 determination and control. The signal from VGA 1006 is equalized through receiver equalizer (RXEQ) 1014, and provided to slicer 1016 to generate decisions for its input data symbols. Decisions from slicer 1016 are then employed both VGA adaptation module 1010 for VGA gain update coefficient generation and TX adaptation module 1018 for TX coefficient generation. Generated coefficients from TX adaptation module 1018 are provided to TX mapper 1008. TX mapper 1008, in turn, translates the VGA gain update information into transmitter amplitude gain update information corresponding to the transmitter main, precursor and post cursor values (e.g., C0, CM1 and CP1) that is then provided to TX 1002.

Returning to FIG. 6, for the case of step 603, for example, a gain increase translates to a C0 value increase, and so the process accordingly scales up CM1 and CP1. When the TX amplitude is increased by increasing the C0, then the CM1 and CP1 are each scaled up accordingly to preserve the TX equalization that was calculated during the adaptation process described previously.

At step 604, a test determines whether the transmitter amplitude has reached a threshold. If the test of step 604 determines that the transmitter threshold has not been reached, at step 605, the translated transmitter amplitude gain update corresponding to the transmitter main, precursor and post cursor values (e.g., C0, CM1 and CP1) is provided to the transmitter through the back channel.

If the test of step 604 determines that the transmitter amplitude threshold (upper or lower) has been reached, the process advances to step 606. If, for example, the LL determines the link partner transmitter amplitude values have reached their maximum values, then the process is no longer able to adjust transmitter gain. At step 605, the TX update request is denied ("not honored") and a "not updated" feedback message is sent to the receiver. In such case, at step 607, the VGA's RX update gain is applied in the RX VGA, even though the applied VGA gain is beyond the constrained VGA range, unless the RX VGA has also reached its maximum gain.

Currently, the SAS standard defines the transmitter coefficient and amplitude mapping tables that are implemented in TX mapper presented herein. The SAS transmitter coefficient and amplitude is presented here for reference purposes, although one skilled in the art might readily extend the teachings herein to other systems. FIG. 11 shows an exemplary table for SAS transmitter coefficient requests and corresponding transmitter circuit response.

While the above-described embodiments involve the adaptation of a transmit filter coefficients, the adaptation techniques described herein are also applicable to the adaption of coefficients for filters within a receiver, such as an equalizer or the like.

For purposes of this description and unless explicitly stated otherwise, each numerical value and range should be interpreted as being approximate as if the word "about" or "approximately" preceded the value of the value or range. Further, signals and corresponding nodes, ports, inputs, or outputs may be referred to by the same name and are interchangeable.

Additionally, reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the terms "implementation" and "example."

Also for purposes of this description, the terms "couple," "coupling," "coupled," "connect," "connecting," or "connected," refer to any manner known in the art or later developed in which a signal is allowed to be transferred between two or more elements and the interposition of one or more additional elements is contemplated, although not required. Conversely, the terms "directly coupled," "directly connected," etc., imply the absence of such additional elements.

It is understood that various changes in the details, materials, and arrangements of the parts which have been described and illustrated in order to explain the nature of this invention may be made by those skilled in the art without departing from the scope of the embodiments of the invention as encompassed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. Apparatus for joint adaptation of transmitter and receiver gain during an initial adaptation period, the apparatus comprising:
a receiver having an amplifier, wherein the receiver is configured to adaptively update the amplifier gain via a receiver gain update process to generate each receiver gain update;

a transmitter mapper coupled to the receiver; and
a back-channel coupled between a transmitter and the transmitter mapper;
wherein the transmitter mapper is adapted to:
   a) monitor a receiver gain update of the receiver, and
   b) compare the receiver gain update with a constrained range of the amplifier;
wherein, if the receiver gain update is outside of the constrained range of the amplifier, the transmitter mapper is further adapted to translate the receiver gain update into a transmitter amplitude gain and generate a transmitter update request including the transmitter amplitude gain for transmission through the back-channel.

2. The apparatus of claim 1 wherein the transmitter mapper is further adapted to compare the transmitter amplitude gain of the transmitter update request to a threshold of the transmitter and, if the transmitter amplitude gain reaches the threshold, deny transmission of the transmitter update request.

3. The apparatus of claim 2 wherein the transmitter mapper is further configured to implement the receiver gain update when the transmission of the transmitter update request is denied, unless the receiver gain update is outside of an operating range of the amplifier.

4. The apparatus of claim 1 wherein the transmitter amplitude gain represents one or more of main-curser, post-curser, and pre-curser values of the transmitter.

5. The apparatus of claim 4 wherein the main-curser, post-curser, and pre-curser values are C0, CM1 and CP1 coefficients.

6. The apparatus of claim 1 wherein the back-channel is configured for exchange of information at a link layer for the transmitter mapper between the transmitter and receiver.

7. The apparatus of claim 1 wherein the amplifier is a variable gain amplifier of the receiver.

8. The apparatus of claim 1 wherein the transmitter mapper generates the transmitter amplitude gain as a main-curser value scaled by a factor, and the transmitter mapper is further configured to scale current post-curser and pre-curser values of the transmitter by the factor.

9. The apparatus of claim 1 wherein the apparatus operates in accordance with one or more of PCIe Gen3, 12G SAS, SAS-3, 16GFC, and 10 GBASE-KR serial communication protocols.

10. The apparatus of claim 1 wherein the apparatus is included in a serializer-deserializer (SERDES) transceiver.

11. A method of joint adaptation of transmitter and receiver coefficients during an initial adaptation period, comprising:
   a) receiving, from a channel, serialized data from a transmitter, the transmitter having at least one adjustable transmitter coefficient;
   b) applying gain to the serialized data by an amplifier having at least one adjustable gain coefficient, wherein the gain is within a defined gain range of the amplifier, wherein the applying gain includes adaptively updating the amplifier gain via a receiver gain update process to generate each receiver gain update;
   c) determining a gain update value for the amplifier having at least one adjustable gain coefficient;
   d) testing, by a transmitter mapper, whether the determined gain update value is within a subset range of the defined gain range of the amplifier; and
   if the determined gain update value is outside of the subset range,
   e) translating the gain update value into a transmitter update request, the transmitter update request including at least one adjustable transmitter coefficient value.

12. The method of claim 11, further comprising:
   determining if the transmitter coefficient value of the transmitter update request is within a amplitude range of the transmitter; and, if so,
   transmitting the transmitter update request to the transmitter through a back channel.

13. The method of claim 11 comprising comparing the transmitter amplitude gain of the transmitter update request to a threshold of the transmitter and, if the transmitter amplitude gain reaches the threshold, denying transmission of the transmitter update request; and
   implementing the receiver gain update when the transmission of the transmitter update request is denied, unless the receiver gain update is outside of an operating range of the amplifier.

14. The method of claim 11 including exchanging, through the back-channel, information at a link layer for the transmitter mapper between the transmitter and receiver.

15. The method of claim 11 wherein the step e) translating the gain update value into a transmitter update request includes generating a main curser value with a scaling factor and scaling current pre-curser and post-curser values by the scaling factor as the at least one adjustable transmitter coefficient value.

16. The method of claim 11 wherein the method includes operating in accordance with one or more of PCIe Gen3, 12G SAS, SAS-3, 16GFC, and 10GBASE-KR serial communication protocols.

17. The method of claim 11 wherein the method is implemented in a serializer-deserializer (SERDES) transceiver.

18. A non-transitory machine-readable storage medium, having encoded thereon program code, wherein, when the program code is executed by a machine, the machine implements a method for joint adaptation of transmitter and receiver coefficients during an initial adaptation period, comprising the steps of;
   a) receiving, from a channel, serialized data from a transmitter, the transmitter having at least one adjustable transmitter coefficient;
   b) applying gain to the serialized data by an amplifier having at least one adjustable gain coefficient, wherein the gain is within a defined gain range of the amplifier, wherein the applying gain includes adaptively updating the amplifier gain via a receiver gain update process to generate each receiver gain update;
   c) determining a gain update value for the amplifier having at least one adjustable gain coefficient;
   d) testing whether the determined gain update value is within a subset constrained range of the defined gain range of the amplifier; and
   if the determined gain update value is outside of the subset range,
   e) translating the gain update value into at least one adjustable transmitter coefficient value for a transmitter update request;
   f) testing whether the at least one adjustable transmitter coefficient value reaches a threshold and, if not, transmitting the transmitter update request to the transmitter through a back channel and updating the transmitter with the at least one adjustable transmitter coefficient value; otherwise
   g) applying the gain update value to the amplifier.

* * * * *